(12) United States Patent
Belakshe et al.

(10) Patent No.: US 10,023,788 B2
(45) Date of Patent: Jul. 17, 2018

(54) ACIDIZING FLUIDS AND METHODS FOR USE IN SUBTERRANEAN FORMATIONS

(71) Applicant: Halliburton Energy Services, Inc., Houston, TX (US)

(72) Inventors: Ravikant S. Belakshe, Pune (IN); Ramesh Uppuluri, Pune (IN); Sumit Ramesh Songire, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 57 days.

(21) Appl. No.: 14/432,298

(22) PCT Filed: Jun. 6, 2014

(86) PCT No.: PCT/US2014/041363
§ 371 (c)(1),
(2) Date: Mar. 30, 2015

(87) PCT Pub. No.: WO2015/187178
PCT Pub. Date: Dec. 10, 2015

(65) Prior Publication Data
US 2016/0257874 A1 Sep. 8, 2016

(51) Int. Cl.
*C09K 8/72* (2006.01)
*E21B 43/25* (2006.01)
(Continued)

(52) U.S. Cl.
CPC .................. *C09K 8/72* (2013.01); *C09K 8/52* (2013.01); *C09K 8/528* (2013.01); *C09K 8/74* (2013.01); *E21B 37/00* (2013.01); *E21B 43/25* (2013.01)

(58) Field of Classification Search
CPC .................................. C09K 8/528; E21B 37/06
See application file for complete search history.

(56) References Cited

U.S. PATENT DOCUMENTS 2,877,848 A * 3/1959 Case ...................... C09K 8/528
166/305.1
4,048,126 A * 9/1977 Gibbons .................. C08G 8/00
525/534

(Continued)

FOREIGN PATENT DOCUMENTS

WO 2015187178 A1 12/2015

OTHER PUBLICATIONS

Wang et al., "Highly Efficient Production of Lactic Acid from Cellulose Using Lanthanide Triflate Catalysts," Green Chem., 2013, 15, 2091-2095, RSC Publication.
(Continued)

*Primary Examiner* — William D Hutton, Jr.
*Assistant Examiner* — Avi T Skaist
(74) *Attorney, Agent, or Firm* — McDermott Will & Emery LLP

(57) ABSTRACT

Methods for acidizing subterranean formations may include introducing into a wellbore penetrating the subterranean formation having a temperature of about 275° F. or greater a treatment fluid comprising an aqueous fluid, a Lewis acid catalyst and a precursor; wherein the precursor is selected from the group consisting of a saccharide, a saccharide derivative, and a combination thereof; and reacting the precursor and the Lewis acid catalyst to yield an organic acid in a portion of the subterranean formation, a portion of the wellbore, or both.

19 Claims, 1 Drawing Sheet

(51) Int. Cl.
*C09K 8/528* (2006.01)
*C09K 8/74* (2006.01)
*C09K 8/52* (2006.01)
*E21B 37/00* (2006.01)

(56) References Cited

U.S. PATENT DOCUMENTS

| | | | |
|---|---|---|---|
| 4,320,014 A | 3/1982 | Vivian | |
| 5,678,632 A * | 10/1997 | Moses | C09K 8/528 166/300 |
| 7,921,912 B2 | 4/2011 | Saini et al. | |
| 2007/0169938 A1 | 7/2007 | Moorehead et al. | |
| 2008/0035341 A1 | 2/2008 | Saini et al. | |
| 2009/0025933 A1 * | 1/2009 | Garcia-Lopez de Victoria | C09K 8/528 166/279 |
| 2010/0152069 A1 * | 6/2010 | Harris | C09K 8/524 507/201 |
| 2011/0214860 A1 | 9/2011 | Tonmukayakul et al. | |
| 2012/0115759 A1 | 5/2012 | Reyes | |
| 2013/0281734 A1 | 10/2013 | Chambon et al. | |
| 2014/0116708 A1 | 5/2014 | Wadekar et al. | |

OTHER PUBLICATIONS

Peng et al., "Catalytic Conversion of Cellulose to Levulinic Acid by Metal Chlorides," Molecules 2010, 15, 5258-5272.
Zhou et al., Catalytic Conversion of Lignocellulosic Biomass to Fine Chemicals and Fuels, Chem. Soc. Rev., 2011, 40, 5588-5617.
International Search Report and Written Opinion for PCT/US2014/041363 dated Feb. 17, 2015.
Reyes et al., Carbonate Stimulation with Biodegradable Chelating Agent Having Broad Unique Spectrum (pH, Temperature, Concentration) Activity, SPE 164380, 2013.

* cited by examiner

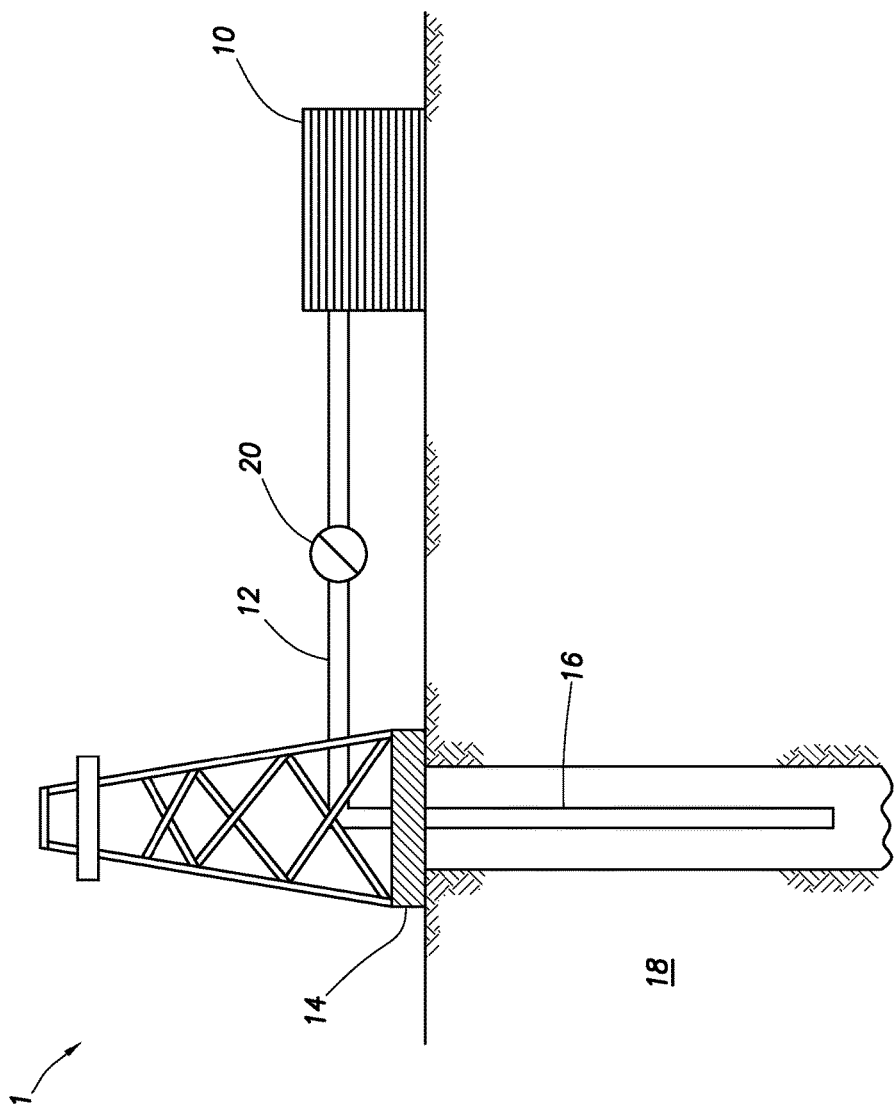

US 10,023,788 B2

ACIDIZING FLUIDS AND METHODS FOR USE IN SUBTERRANEAN FORMATIONS

BACKGROUND

The present disclosure relates to generally to acidizing operations relative to subterranean formations.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like.

Acidizing operations may be performed to stimulate a subterranean formation to increase production of a hydrocarbon resource therefrom. An acidizing fluid (e.g., a treatment fluid comprising hydrochloric acid) may be used to dissolve an acid-soluble material in the subterranean formation (e.g., carbonates, silicates, and aluminosilicates). In the case of carbonate formations, the acidizing fluid may produce an interconnected network of conductive pathways known as wormholes. During production operations, the wormholes provide pathways for the hydrocarbons to move from the formation and into the wellbore.

However, as the temperature of the subterranean formation increases (e.g., above about 250° F.), hydrochloric acid may react with the formation more aggressively and, rather than forming wormholes through the formation, dissolve the full face of the formation. As such, the acidizing fluid may not penetrate as deeply into the formation to reach hydrocarbon reserves, which leads to less productive wells.

Additionally, at the elevated temperature, hydrochloric acid may corrode downhole tools and tubulars to a greater extent, which may require a costly and time-consuming operation to retrieve and replace the tool or tubular. Therefore, in higher-temperature acidizing operations, an alternative acidizing fluid may be needed.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system that can deliver treatment fluids of the present disclosure to a downhole location, according to one or more embodiments.

DETAILED DESCRIPTION

The present disclosure generally relates to acidizing operations relative to subterranean formations, and, more specifically, to in situ acid production in wellbores and/or subterranean formations of about 275° F. or greater.

The treatment fluids and methods described herein comprise the use of a Lewis acid catalyst with precursor; wherein the precursor is either a saccharide, a derivative of saccharide, or a combination thereof; and, wherein the components react at a temperature of about 275° F. or greater to form organic acids. The organic acids may, in some instances, be useful in acidizing a carbonate-containing subterranean formation, dissolving scale, removing filter cakes, reducing formation damage caused by carbonate-containing drilling fluid additives, and any combination thereof. In some instances, the organic acids produced downhole may react less vigorously with a carbonate formation than hydrochloric acid at about 250° F. or greater, which may provide for the formation wormholes or the like that allow for greater hydrocarbon production.

The treatment fluids generally also comprise an aqueous fluid as a base fluid.

In some embodiments, the treatment fluid is an acidizing fluid that consists essentially of a Lewis acid catalyst and a precursor; wherein the precursor is either a saccharide, a derivative of saccharide, or a combination thereof; and, wherein the components react at temperature of about 275° F. or greater to form organic acids. That is, treatment fluid is capable of acidizing an acid-susceptible formation (such as a carbonate formation) without the presence of additional acids or acid precursors. These embodiments include matrix acidizing and fracture acidizing embodiments.

Examples of aqueous fluids suitable for use in conjunction with the treatment fluids described herein may include, for example, fresh water, acidified water, salt water, seawater, brine (e.g., a saturated salt solution), or an aqueous salt solution (e.g., a non-saturated salt solution). Exemplary salts in the foregoing may include potassium chloride, sodium chloride, sodium bromide, and the like. Aqueous fluids may be obtained from any suitable source, provided that it does not contain in significant concentrations components that might adversely affect the stability of the treatment fluid, performance of the treatment fluid, the reaction between the saccharide or derivative thereof and the Lewis acid catalyst, or any combination thereof.

Examples of precursors suitable for use in conjunction with the treatment fluids described herein may include saccharides and derivatives of saccharides, such as: polysaccharides, dextran, chitin, chitosan, monosaccharides (e.g., glyceraldehyde, dihydroxyacetone, erythrose, arabinose, xylose, ribose, glucose, galactose, mannose, and fructose), disaccharides (e.g., sucrose, lactose, maltose, cellobiose, and trehalose), trisaccharides (e.g., raffinose), tetrasaccharides (e.g., stachylose), pentosans (e.g., arabans and xylans), hexosans (e.g., starch, dextrins, glycogen, cellulose, inulin, levan, galactans, and mannans), hemicellulose, gums, mucilages, pectic substances, mucopolysaccharides, and the like, and any combination thereof.

In some embodiments, the precursor may be present in the treatment fluid in an amount ranging from a lower limit of about 0.01%, 0.1%, or 1% wt/vol of the aqueous fluid to an upper limit of about 5%, 4%, 3%, or 2% wt/vol of the aqueous fluid, and wherein the amount of the saccharide or derivative thereof may range from any lower limit to any upper limit and encompasses any subset therebetween.

In some embodiments, a Lewis acid catalyst may be a metal-based Lewis acid catalyst based on one of the following aluminum, boron, silicon, tin, titanium, zinc, iron, copper, lanthanum, cerium, praseodymium, neodymium, samarium, europium, gadolinium, terbium, dysprosium, holmium, erbium, thulium, ytterbium, lutetium, and yttrium. Examples of Lewis acid catalysts suitable for use in conjunction with the treatment fluids described herein may include, but are not limited to, $TiCl_4$, $BF_3$, $SnCl_2$, $AlCl_3$, $FeCl_3$, $NiCl_2$, $ErCl_3$, $LaCl_3$, $ZnCl_2$, $La(OTf)_3$, $Ce(OTf)_3$, $Pr(OTf)_3$, $Nd(OTf)_3$, $Sm(OTf)_3$, $Eu(OTf)_3$, $Gd(OTf)_3$, $Tb(OTf)_3$, $Dy(OTf)_3$, $Ho(OTf)_3$, $Er(OTf)_3$, $Tm(OTf)_3$, $Yb(OTf)_3$, $Lu(OTf)_3$, $Y(OTf)_3$, and the like, and any combination thereof.

In some embodiments, a Lewis acid catalyst may be present in the treatment fluid in an amount ranging from a lower limit of about 0.001%, 0.01%, or 0.05% wt/vol of the aqueous fluid to an upper limit of about 1%, 0.5%, or 0.1% wt/vol of the aqueous fluid, and wherein the amount of the Lewis acid catalyst may range from any lower limit to any upper limit and encompasses any subset therebetween.

In some embodiments, the ratio of saccharide or derivative thereof to Lewis acid catalyst may range from a lower limit of about 2:1 or 4:1 to an upper limit of about 10:1, 8:1, or 5:1, and wherein the amount of the Lewis acid catalyst may range from any lower limit to any upper limit and encompasses any subset therebetween.

In some embodiments, a saccharide or derivative thereof and a Lewis acid may react to form an organic acid at a temperature of about 275° F. or greater (e.g., about 275° F. to about 550° F.). Examples of organic acids that may be formed may include, but are not limited to, lactic acid, formic acid, acetic acid, levulinic acid, and the like, and any combination thereof. In some instances, the organic acid formed may contain 50% or greater by volume lactic acid.

In some instances, a treatment fluid described herein may further comprise additives. Examples of additives may include, but are not limited to, weighting agents, inert solids, fluid loss control agents, emulsifiers, dispersion aids, corrosion inhibitors, emulsion thinners, emulsion thickeners, viscosifying agents, gelling agents, surfactants, particulates (such as proppant or gravel), lost circulation materials, foaming agents, gases, pH control additives, breakers, biocides, crosslinkers, stabilizers, chelating agents, scale inhibitors, gas hydrate inhibitors, mutual solvents, reducers, friction reducers, clay stabilizing agents, and the like, and any combination thereof.

Some embodiments may involve introducing a treatment fluid described herein (e.g., comprising an aqueous fluid, a precursor, a Lewis acid catalyst, and optionally an additive) into a wellbore penetrating a subterranean formation. Some embodiments may further involve reacting the precursor and the Lewis acid catalyst in a portion of the subterranean formation, a portion of the wellbore, or both having a temperature of about 275° F. or greater. In some instances, the portion of the subterranean formation, the portion of the wellbore, or both may have a temperature of about 300° F. or greater. In some instances, the portion of the subterranean formation, the portion of the wellbore, or both may have a temperature ranging from a lower limit of about 275° F., 300° F., or 325° F. to an upper limit of about 550° F., 500° F., or 450° F., and wherein the temperature may range from any lower limit to any upper limit and encompasses any subset therebetween.

In some embodiments, the treatment fluid before introduction into the wellbore may have a pH of about 4 or greater (e.g., about 5 or greater or about pH 4 to about pH 8).

In some instances, a treatment fluid described herein may be used in a full-scale operations or a pill. As used herein, a "pill" is a type of relatively small volume of specially prepared treatment fluid placed or circulated in the wellbore.

In some instances, a treatment fluid described herein may be used for acidizing stimulation. For example, some embodiments may involve introducing a treatment fluid described herein into a wellbore penetrating a subterranean formation below a fracture gradient pressure of the subterranean formation. Then, the organic acid formed downhole may react with calcium carbonate in the subterranean formation. In some instances, wormholes may be formed in the subterranean formation.

In some instances, a treatment fluid described herein may be used for fracture acidizing stimulation. For example, some embodiments may involve introducing a treatment fluid described herein into a wellbore penetrating a subterranean formation at or above a fracture gradient pressure of the subterranean formation. Then, the organic acid formed downhole may react with calcium carbonate in the subterranean formation. In some instances, wormholes may be formed in the subterranean formation.

In some instances, a treatment fluid described herein may be used for removing a filter cake in the wellbore. For example, in some instances, a portion of the wellbore may be drilled with a drilling fluid comprising calcium carbonate particles. During drilling, the filter cake may form and include the calcium carbonate particles. Then, the organic acid formed downhole with the treatment fluids described herein may react with the a portion of a filter cake (e.g., the calcium carbonate particles), thereby removing least a portion of the filter cake from the wellbore.

In some instances, a treatment fluid described herein may be used for reducing formation damage caused by carbonate-containing drilling fluid additives. For example, in some instances, a portion of the wellbore may be drilled with a drilling fluid comprising calcium carbonate particles. During drilling, at least some of the calcium carbonate particles may infiltrate near-wellbore portions of the subterranean formation and reduce the permeability therethrough (e.g., by becoming lodged in the pores and vugs of the formation). Then, the organic acid formed downhole with the treatment fluids described herein may react with the a portion of a filter cake (e.g., the calcium carbonate particles), thereby removing least a portion of the filter cake from the wellbore.

In some instances, a treatment fluid described herein may be used for dissolving scale in the formation, the wellbore, or both. In some instances, aqueous fluids downhole (native, introduced, or a mixture thereof) may contain salts and minerals at a concentration that facilitates precipitation of salts and minerals onto surfaces within the wellbore, the subterranean formation, or both. In some instances, scale may form as the temperature of the aqueous fluid decreases and the saturation concentration for the salts and minerals decreases. This effect may be seen in high temperature formations as the fluids decrease in temperature during production to the surface. The precipitated salts and minerals may reduce the ability to flow fluids through the wellbore, the formation, or both. In some embodiments, a treatment fluid described herein may be introduced into a wellbore, and the organic acid formed downhole may react with scale present downhole.

In some embodiments, at least some of the Lewis acid catalyst in the treatment fluids described herein may be recovered from the wellbore. For example, a flowback operation may be performed. That is, some embodiments may involve allowing at least a portion of the treatment fluid to flow back from the wellbore, the subterranean formation, or both to the wellhead, and recovering at least some of the Lewis acid catalyst.

In various embodiments, systems configured for delivering the treatment fluids described herein to a downhole location are described. In various embodiments, the systems can comprise a pump fluidly coupled to a tubular, the tubular containing a treatment fluid comprising an aqueous fluid, a precursor, a Lewis acid catalyst, and optionally an additive.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. In some instances, tubular 16 may have a plurality of orifices (not shown) through which the treatment fluid of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. a method that includes introducing into a wellbore penetrating a subterranean formation having a temperature of about 275° F. or greater a treatment fluid comprising an aqueous fluid, a Lewis acid catalyst and a precursor; wherein the precursor is selected from the group consisting of a saccharide, a saccharide derivative, and a combination thereof; and reacting the precursor and the Lewis acid catalyst to yield an organic acid in a portion of the subterranean formation, a portion of the wellbore, or both;

B. a treatment fluid that includes a precursor selected from the group consisting of a saccharide, a saccharide derivative, and a combination thereof; and a metal-based Lewis acid catalyst that comprises at least one selected from the group consisting of: aluminum, boron, silicon, tin, titanium, zinc, iron, copper, lanthanum, cerium, praseodymium, neodymium, samarium, europium, gadolinium, terbium, dysprosium, holmium, erbium, thulium, ytterbium, lutetium, and yttrium; and C. a system that includes a wellhead with a tubular extending therefrom and into a wellbore in a subterranean formation; and a pump fluidly coupled to a tubular, the tubular containing a treatment fluid that comprises an aqueous fluid, a saccharide or derivative thereof, and a Lewis acid catalyst.

Each of embodiments A, B, and C may have one or more of the following additional elements in any combination: Element 1: wherein the Lewis acid catalyst is a metal-based Lewis acid catalyst that comprises at least one selected from the group consisting of: aluminum, boron, silicon, tin, titanium, zinc, iron, copper, lanthanum, cerium, praseodymium, neodymium, samarium, europium, gadolinium, terbium, dysprosium, holmium, erbium, thulium, ytterbium, lutetium, and yttrium; Element 2: wherein the Lewis acid catalyst comprises at least one selected from the group consisting of: $TiCl_4$, $BF_3$, $SnCl_2$, $AlCl_3$, $FeCl_3$, $NiCl_2$, $ErCl_3$, $LaCl_3$, $ZnCl_2$, $La(OTf)_3$, $Ce(OTf)_3$, $Pr(OTf)_3$, $Nd(OTf)_3$, $Sm(OTf)_3$, $Eu(OTf)_3$, $Gd(OTf)_3$, $Tb(OTf)_3$, $Dy(OTf)_3$, $Ho(OTf)_3$, $Er(OTf)_3$, $Tm(OTf)_3$, $Yb(OTf)_3$, $Lu(OTf)_3$, $Y(OTf)_3$, and any combination thereof; Element 3: wherein the Lewis acid catalyst is present in the treatment fluid in an amount of about 0.001% to about 1% wt/vol of the aqueous fluid; Element 4: wherein the precursor comprises at least one selected from the group consisting of: a polysaccharide, dextran, chitin, chitosan, a monosaccharide, a disaccharide, a trisaccharide, a tetrasaccharides a pentosan, a hexosan, hemicellulose, a gum, a mucilage, a pectic substance, a mucopolysaccharide, and the like, and any combination thereof; Element 5: wherein the precursor is present in the treatment fluid in an amount of about 0.01% to about 5% wt/vol of the aqueous fluid; Element 6: wherein the precursor and the Lewis acid catalyst are present in the treatment fluid at a weight ratio of about 2:1 to about 10:1; Element 7: wherein the treatment fluid is at pH 4 or greater (before introduction into the wellbore for Embodiment A); Element 8: wherein the organic acid comprises at least one selected from the group consisting of: lactic acid, formic acid, acetic acid, levulinic acid, and any combination thereof; and Element 9: wherein the organic acid comprises at least 50% by volume lactic acid.

By way of non-limiting example, exemplary combinations applicable to Embodiments A, B, C include: Element 1 or 2 in combination with Element 3 and optionally in combination with Element 7; Element 1 or 2 in combination with Element 4 and optionally in combination with Element 7; Element 4 in combination with Element 7 and optionally in combination with Element 5; Element 8 in combination with Element 9 and optionally in combination with Elements 7; Elements 1, 4, and 9 in combination; Elements 2, 4, and 9 in combination; Element 6 in combination with any of the foregoing; and so on.

Embodiment A may have one or more of the following additional elements in combination with any of the foregoing elements and combinations thereof: Element 10: the method further including reacting the organic acid with calcium carbonate in the subterranean formation; Element 11: the method further including reacting the organic acid with a portion of a filter cake disposed in the wellbore; Element 12: the method further including reacting the organic acid with carbonate-containing particulates; Element 13: the method further including reacting the organic acid with carbonate-containing particulates and drilling at least a portion of the wellbore with a drilling fluid comprising the carbonate-containing particulates before introducing the treatment fluid; Element 14: the method further including reacting the organic acid with a carbonate-containing scale; and Element 15: the method further including recovering at least a portion of the Lewis acid catalyst after forming the organic acid.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques. Additionally, when used at the beginning of a list of numbers, the term "about" modifies each number in the list. Further, in some numerical listings of ranges, some lower limits listed may be greater than some upper limits listed. One skilled in the art will recognize that the selected subset will require the selection of an upper limit in excess of the selected lower limit.

One or more illustrative embodiments incorporating the embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. A method comprising:
    introducing into a wellbore penetrating a subterranean formation having a temperature of about 275° F. or greater a treatment fluid consisting essentially of an aqueous fluid, a Lewis acid catalyst present in the treatment fluid in an amount of about 0.001% to about 1% wt/vol of the aqueous fluid, and a precursor, wherein the precursor is selected from the group consisting of a saccharide, a saccharide derivative, and a combination thereof, and the aqueous fluid is selected from the group consisting of fresh water, acidified water, salt water, seawater and a salt solution;
    reacting, at a temperature of about 275° F. or greater, the precursor and the Lewis acid catalyst to yield an organic acid in a portion of the subterranean formation, a portion of the wellbore, or both, and
    reacting the organic acid with calcium carbonate in the subterranean formation to form wormholes in the subterranean formation.

2. The method of claim 1 further comprising:
    reacting the organic acid with a portion of a filter cake disposed in the wellbore.

3. The method of claim 1 further comprising:
    reacting the organic acid with carbonate-containing particulates.

4. The method of claim 3 further comprising:
    drilling at least a portion of the wellbore with a drilling fluid comprising the carbonate-containing particulates before introducing the treatment fluid.

5. The method of claim 1 further comprising:
    reacting the organic acid with a carbonate-containing scale.

6. The method of claim 1, wherein the Lewis acid catalyst is a metal-based Lewis acid catalyst that comprises at least one metal selected from the group consisting of: aluminum, boron, silicon, tin, titanium, zinc, iron, copper, lanthanum, cerium, praseodymium, neodymium, samarium, europium, gadolinium, terbium, dysprosium, holmium, erbium, thulium, ytterbium, lutetium, and yttrium.

7. The method of claim 1, wherein the Lewis acid catalyst comprises at least one selected from the group consisting of: $TiCl_4$, $BF_3$, $SnCl_2$, $AlCl_3$, $FeCl_3$, $NiCl_2$, $ErCl_3$, $LaCl_3$, $ZnCl_2$, $La(OTf)_3$, $Ce(OTf)_3$, $Pr(OTf)_3$, $Nd(OTf)_3$, $Sm(OTf)_3$, $Eu(OTf)_3$, $Gd(OTf)_3$, $Tb(OTf)_3$, $Dy(OTf)_3$, $Ho(OTf)_3$, $Er(OTf)_3$, $Tm(OTf)_3$, $Yb(OTf)_3$, $Lu(OTf)_3$, $Y(OTf)_3$, and any combination thereof.

8. The method of claim 1, wherein the saccharide or the saccharide derivative comprises at least one selected from the group consisting of: a polysaccharide, dextran, chitin, chitosan, a monosaccharide, a disaccharide, a trisaccharide, a tetrasaccharide, a pentosan, a hexosan, hemicellulose, a gum, a mucilage, a pectic substance, a mucopolysaccharide, and the like, and any combination thereof.

9. The method of claim 1, wherein the precursor is present in the treatment fluid in an amount of about 0.01% to about 5% wt/vol of the aqueous fluid.

10. The method of claim 1, wherein the precursor and the Lewis acid catalyst are present in the treatment fluid at a weight ratio of about 2:1 to about 10:1.

11. The method of claim 1, wherein the treatment fluid is at pH 4 or greater before introduction into the wellbore.

12. The method of claim 1, wherein the organic acid comprises at least one selected from the group consisting of: lactic acid, formic acid, acetic acid, levulinic acid, and any combination thereof.

13. The method of claim 1, wherein the organic acid comprises at least 50% by volume lactic acid.

14. The method of claim 1 further comprising:
    recovering at least a portion of the Lewis acid catalyst after forming the organic acid.

15. A system comprising:
    a wellhead with a tubular extending therefrom and into a wellbore in a subterranean formation having a temperature of about 275° F. or greater; and
    a pump fluidly coupled to a tubular, the tubular containing a treatment fluid consisting essentially of an aqueous fluid, a Lewis acid catalyst present in the treatment fluid in an amount of about 0.001% to about 1% wt/vol of the aqueous fluid, and a precursor, wherein the precursor is selected from the group consisting of a saccharide, a saccharide derivative, and a combination thereof, and the aqueous fluid is selected from the group consisting of fresh water, acidified water, salt water, seawater and a salt solution,
    wherein the precursor and the Lewis acid react to yield an organic acid in the subterranean formation having the temperature of about 275° F. or greater, and
    wherein the organic acid reacts with calcium carbonate in the subterranean formation to form wormholes in the subterranean formation.

16. A method comprising:
    introducing into a wellbore penetrating a subterranean formation having a temperature of about 275° F. or greater a treatment fluid consisting essentially of an aqueous fluid, a Lewis acid catalyst present in the treatment fluid in an amount of about 0.001% to about 1% wt/vol of the aqueous fluid, and a precursor, wherein the precursor is selected from the group consisting of a saccharide, a saccharide derivative, and a combination thereof, and the aqueous fluid is selected from the group consisting of fresh water, acidified water, salt water, seawater and a salt solution;
    reacting, at a temperature of about 275° F. or greater, the precursor and the Lewis acid catalyst to yield an organic acid in a portion of the subterranean formation, a portion of the wellbore, or both;
    reacting the organic acid with calcium carbonate in the subterranean formation to form wormholes in the subterranean formation; and
    recovering to the surface at least a portion of the Lewis acid catalyst after forming the organic acid.

17. The method of claim 16, wherein the Lewis acid catalyst is a metal-based Lewis acid catalyst that comprises at least one metal selected from the group consisting of: aluminum, boron, silicon, tin, titanium, zinc, iron, copper, lanthanum, cerium, praseodymium, neodymium, samarium, europium, gadolinium, terbium, dysprosium, holmium, erbium, thulium, ytterbium, lutetium, and yttrium.

18. The method of claim 16, wherein the Lewis acid catalyst comprises at least one selected from the group consisting of: $TiCl_4$, $BF_3$, $SnCl_2$, $AlCl_3$, $FeCl_3$, $NiCl_2$, $ErCl_3$, $LaCl_3$, $ZnCl_2$, $La(OTf)_3$, $Ce(OTf)_3$, $Pr(OTf)_3$, $Nd(OTf)_3$, $Sm(OTf)_3$, $Eu(OTf)_3$, $Gd(OTf)_3$, $Tb(OTf)_3$, $Dy(OTf)_3$, $Ho(OTf)_3$, $Er(OTf)_3$, $Tm(OTf)_3$, $Yb(OTf)_3$, $Lu(OTf)_3$, $Y(OTf)_3$, and any combination thereof.

19. The method of claim 16, wherein the saccharide or the saccharide derivative comprises at least one selected from the group consisting of: a polysaccharide, dextran, chitin, chitosan, a monosaccharide, a disaccharide, a trisaccharide, a tetrasaccharide, a pentosan, a hexosan, hemicellulose, a gum, a mucilage, a pectic substance, a mucopolysaccharide, and the like, and any combination thereof.

* * * * *